(12) United States Patent
Williamson

(10) Patent No.: US 8,271,733 B2
(45) Date of Patent: Sep. 18, 2012

(54) LINE ALLOCATION IN MULTI-LEVEL HIERARCHICAL DATA STORES

(75) Inventor: Barry Duane Williamson, Cedar Park, TX (US)

(73) Assignee: ARM Limited, Cambridge (GB)

( * ) Notice: Subject to any disclaimer, the term of this patent is extended or adjusted under 35 U.S.C. 154(b) by 630 days.

(21) Appl. No.: 12/458,690

(22) Filed: Jul. 20, 2009

(65) Prior Publication Data

US 2011/0016281 A1    Jan. 20, 2011

(51) Int. Cl.
*G06F 13/00*   (2006.01)
(52) U.S. Cl. ................... 711/128; 711/144; 711/156
(58) Field of Classification Search .............. 711/128, 711/144, 156
See application file for complete search history.

(56) References Cited

U.S. PATENT DOCUMENTS

| | | | | |
|---|---|---|---|---|
| 5,974,438 | A * | 10/1999 | Neufeld | 718/104 |
| 6,629,218 | B2 * | 9/2003 | Cho | 711/154 |
| 2002/0116584 | A1 * | 8/2002 | Wilkerson | 711/133 |
| 2006/0224829 | A1 * | 10/2006 | Evrard et al. | 711/133 |
| 2006/0288170 | A1 * | 12/2006 | Varma et al. | 711/122 |
| 2009/0049312 | A1 * | 2/2009 | Min | 713/300 |

\* cited by examiner

*Primary Examiner* — Reba I Elmore
(74) *Attorney, Agent, or Firm* — Nixon & Vanderhye P.C.

(57) ABSTRACT

A storage apparatus for storing data is disclosed. The storage apparatus comprises: a plurality of stores having storage locations for storing data items, including a level one store and a level two store the storage apparatus having a hierarchy such that in response to an access request for accessing a data item the level one store is accessed and in response to detecting that the item is not stored in the level one store the level two store is accessed. The storage apparatus is configured to store a copy of at least some items in both of the one level one store and the level two store, the storage apparatus comprising a plurality of indicator storage elements associated with a corresponding plurality of storage locations of the level two store, a set value of an indicator stored in one of the indicator storage elements indicating that the corresponding stored data item is also stored in the level one store. The storage apparatus is configured such that in response to a request to allocate a storage location in the level two store, storage locations having a set indicator associated with them are not selected for eviction.

19 Claims, 6 Drawing Sheets

LINE ALLOCATION IN MULTI-LEVEL HIERARCHICAL DATA STORES

BACKGROUND OF THE INVENTION

1. Field of the Invention

The field of the invention relates to data storage for data processing apparatus and in particular to multi-level hierarchical data storage.

2. Description of the Prior Art

Multi-level cache hierarchies are known in which lower level caches are provided close to a processor to provide easy access to data or instructions. These caches are quick to access, but expensive to implement, and thus, only store a limited subset of the data that may be needed. Additional data may be stored in higher level caches, which are larger and cheaper to implement than the lower level caches, but require more time to access, above this there may be other hierarchical levels of storage such as memory. These can store a very large amount of data but take significantly longer to access.

A drawback with multi-level hierarchies of data storage is that a data item may be stored in more than one level of store at any time, and thus, coherency needs to be maintained between the different stores to ensure that if one copy of the data item is overwritten in one store, the storage system knows which of the multiple stored values is the current value.

Inclusive caches are known and are described in "The Cache Memory Book" by Jim Handy pages 132 to 135, Academic Press second edition, these store duplicate copies of items stored in a lower level cache in a higher level cache. These inclusive caches have generally not been implemented in processors as cache storage space is expensive and thus, there is a prejudice against automatically storing duplicate values.

Another drawback with multi-level hierarchical stores is that when allocating an entry in a higher level store, a lower level store may need to be snooped to determine if the entry is present in the lower level store and this is time consuming.

It would be desirable to provide multi-level hierarchical data stores in which lines can be allocated efficiently.

SUMMARY OF THE INVENTION

A first aspect of the present invention provides a storage apparatus for storing data, said storage apparatus comprising: a plurality of stores having storage locations for storing data items, including at least one level one store and a level two store said storage apparatus having a hierarchy such that in response to an access request for accessing a data item at least one of said at least one level one store is accessed and in response to detecting that said item is not stored in said one of said at least one level one store said level two store is accessed; said storage apparatus being configured to store a copy of at least some items in both of said at least one level one store and said level two store, said storage apparatus comprising a plurality of indicator storage elements associated with a corresponding plurality of storage locations of said level two store, a set value of an indicator stored in one of said indicator storage elements indicating that said corresponding stored data item is also stored in said at least one level one store, wherein said storage apparatus is configured such that in response to a request to allocate a storage location in said level two store storage locations having a set indicator associated with them are not selected for eviction.

Although it is counterintuitive to store duplicate data values unless necessary, it has been found that in certain circumstances it can be advantageous. In particular, if items that do have copies in a lower hierarchy data store are marked as such in the higher level store then provided that on eviction of a line in this data store these items are not selected for eviction, then eviction of other data items from the data store can be performed without the need to communicate with the lower level data store as one will know that the data item is not stored there. This is very advantageous as cleaning and invalidating a line in the lower data store requires stalling of any processor that it is communicating with, which is bad for processor performance. Thus, it has surprisingly been found to improve performance of a data storage system to store duplicate copies of values that are stored in data stores of a lower hierarchical level in higher level stores. In effect traffic from a lower level store to the higher level store when cleaning and invalidating a line is significantly reduced by having these duplicate copies, provided that one is aware of which lines have a duplicate value.

In some embodiments, said plurality of stores comprise set associative stores, each of said set associative stores comprising a tag directory, said tag directory comprising a plurality of storage locations for storing a plurality of tags, each tag indicating a block in said corresponding store where a item is stored and each tag having associated therewith state information, said state information for items in said level two store including said indicator element for said item.

Although this technique can be used in many different types of stores, it has been found to be particularly effective in set associative data stores. A set associative store has a number of ways each containing a number of lines or sets. A data value associated with a particular address can be stored in a particular line of any of the ways. In order to address data stored in this sort of store an address comprising a SET or index portion, which indicates which of the sets or lines the address is referring to and a TAG portion indicating which of the ways it is in is used. In reality more than one data word may be stored in a line within a way and thus, the address may contain further information. Thus, set associative stores are accessed using a tag directory, the tag directory providing an indication of a block or way in the corresponding store where the item can be found. Each tag has state information associated with it, which is generally information related to coherency such as whether the data item stored is valid or is dirty. In embodiments of the present invention the state information additionally includes the indicator element for indicating whether the data item is also stored in a lower level store. This is a convenient place to store this information as the state information is accessed when determining which items to overwrite, and the indicator element is also relevant in this determination.

In some embodiments, said level two store comprises an equal or greater number of ways than a total number of ways of all of said at least one level one stores.

If the level two store has a number of ways that is equal to or greater than the total number of the ways of the level one stores then it is possible to store a copy of all items stored in the level one stores in the level two store. Having additional ways in the level two store provides additional storage locations in this store and reduces the number of times that an entry allocated at a level one store that does not have a duplicate copy in the level two store does not find an available storage location in the level two store and therefore is only present in the level one store. This may occur in certain circumstances where there are a plurality of first level stores, some of which store duplicate values in the level two store and some of which don't. For example, if data caches and instruction caches are the level one stores then the data caches may be implemented as inclusive and have copies in the level two store while the instruction cache may not be inclusive. Providing additional ways in the level two cache provides storage locations for the instruction cache.

In some embodiments, said storage apparatus comprises, a plurality of level one stores, said indicator storage element comprising a plurality of indicators one for each of said plurality of level one stores, a set value of each of said plurality of indicators indicating that said corresponding stored data item is also stored in said corresponding level one store, a data item being selected for eviction from said level two store only if none of said plurality of indicators in said associated indicator storage element are set.

In systems with several level one stores then each level one store may store the same data item and it may therefore be convenient if the level two store has indicator bits corresponding to each level one store. In this way one can determine whether or not the item stored in the level two store has a duplicate value in any of the level one stores and therefore whether it is a candidate for eviction or not when a line in the level two store needs to be allocated. This arrangement also makes the resetting of these indicator bits simple as when an item is evicted from a level one store then the indicator value corresponding to that item and that store can simply be reset in the level two store. If there are multiple level one stores where there may be copies of this item and only one indicator value, then clearly it is more complicated to reset the indicator bit as will be discussed below.

In some embodiments, said storage apparatus comprises, a plurality of level one stores, said storage apparatus being responsive to a data item being evicted from one of said plurality of level one stores to detect if said data item is stored in any other of said plurality of level one stores and if it is not to reset said indicator value stored in association with said data item stored in said level two store.

As noted above if there are a plurality of level one stores then before one can reset the indicator value stored in association with the data item stored in the level two store it must be determined if any of the level one stores store this item. If none of them do it can be reset but if any of them do it cannot be reset.

In some embodiments, said storage apparatus comprises a tag directory corresponding to each of said level one stores in said level two store, said tag directory comprising a plurality of storage locations for storing a plurality of tags, each tag indicating a block in said corresponding store where a item is stored said storage apparatus being configured to detect if said data item is stored in any other of said level one caches from said tag directories.

In order to manage this coherency problem in some embodiments the level two store will contain a copy of the tag directory of each of the level one stores. This is a substantial storage overhead but allows the level two store to snoop these tag directories and see whether or not the data item requested is in any of the level one stores without actually accessing the level one stores. Thus, when an item is evicted from one of the level one stores the tag directories of the other level one stores can be snooped in the level two store and if it is determined that the data item is not stored in any of these level one stores then the indicator value can be reset. If it is determined that the data item is stored in any of the other level one stores then the indicator value is not reset.

In some embodiments, said storage apparatus is configured to store a copy of all data items stored in said at least one level one store in said level two store.

It may be advantageous if the level one store is entirely inclusive, in other words a copy of all data items in the level one store is stored in the level two store. This may be convenient as one can then be certain that all items in the level one store are also present in the level two store which makes cleaning and invalidating the level one store a quick and easy process that only requires access to the level two store.

In some embodiments, in response to a power down signal, said at least one level one store is powered down and said level two store enters a low power data retention mode, said storage apparatus being configured to clean and invalidate all storage locations in said at least one level one store prior to powering down said at least one level one store.

Processors are being designed nowadays that enter low power modes frequently. It is convenient if low power mode can be entered quickly and efficiently as clearly more power will be saved. When entering low power mode the level one data stores need to be cleaned and invalidated. In embodiments of the apparatus the storage apparatus is designed so that the level two store enters data retention mode in response to a power down signal. Where the stores are designed to be inclusive the low power mode can be entered quickly as cleaning and invalidating all storage locations in the level one stores is quick and efficient as these items are stored in the level two store and as such the cleaning and invalidating of the level one store can be performed without access to other higher level stores.

Although this storage apparatus can comprise a number of things it is convenient to design caches in this way. Caches are designed to have hierarchy with level one caches and level two caches and memory.

In order for the indicator to be maintained in a correct state certain rules need to be followed when storing and evicting items from the level one and level two stores.

In some embodiments, said storage apparatus is configured such that: in response to a data item being stored in said at least one level one store that is not stored in said level two store, said data item is allocated a line in said level two store and said corresponding indicator is set; in response to a data item being stored in said at least one level one store that is stored in a storage location in said level two store, said indicator associated with said storage location is set; and in response to a data item being evicted from said at least one level one store and said data item no longer being stored in any level one store, said indicator corresponding to said data item stored in said level two store is reset.

A second aspect of the present invention provides a data processing apparatus having a storage apparatus according to a first aspect of the present invention and a plurality of processors for processing data, said storage apparatus having a corresponding plurality of level one stores, an access request from one of said plurality of processors being routed to a corresponding one of said plurality of level one stores and if said item is not stored in said corresponding level one store said level two store is accessed.

A third aspect of the present invention provides a method of storing data in a data storage apparatus comprising: a plurality of stores including at least one level one store and a level two store said storage apparatus having a hierarchy such that in response to an access request for accessing an item said at least one level one store is accessed and in response to detecting that said item is not stored in said at least one level one store said level two store is accessed; said storage apparatus being configured to store a copy of at least some items in both of said at least one level one store and said level two store, said storage apparatus comprising a plurality of indicator storage elements associated with a corresponding plurality of storage locations for storing a plurality of items of said level two store, a set value of an indicator stored in one of said indicator storage elements indicating that said corresponding stored data item is also stored in said at least one level one store, said method comprising the steps of: receiving a request to allocate a line in said level two store; selecting a line for eviction that does not have an indicator set.

A fourth aspect of the present invention provides a means for storing data, said means for storing data comprising: a plurality of storage means having storage locations for storing data items, including at least one level one storage means and a level two storage means said means for storing data having a hierarchy such that in response to an access request for accessing a data item at least one of said at least one level one storage means is accessed and in response to detecting that said item is not stored in said one of said at least one level one storage means said level two storage means is accessed; said means for storing data being configured to store a copy of at least some items in both of said at least one level one storage means and said level two storage means, said means for storing data comprising a plurality of indicator storage elements associated with a corresponding plurality of storage locations of said level two storage means, a set value of an indicator stored in one of said indicator storage elements indicating that said corresponding stored data item is also stored in said at least one level one storage means, wherein said means for storing data is configured such that in response to a request to allocate a storage location in said level two storage means storage locations having a set indicator associated with them are not selected for eviction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
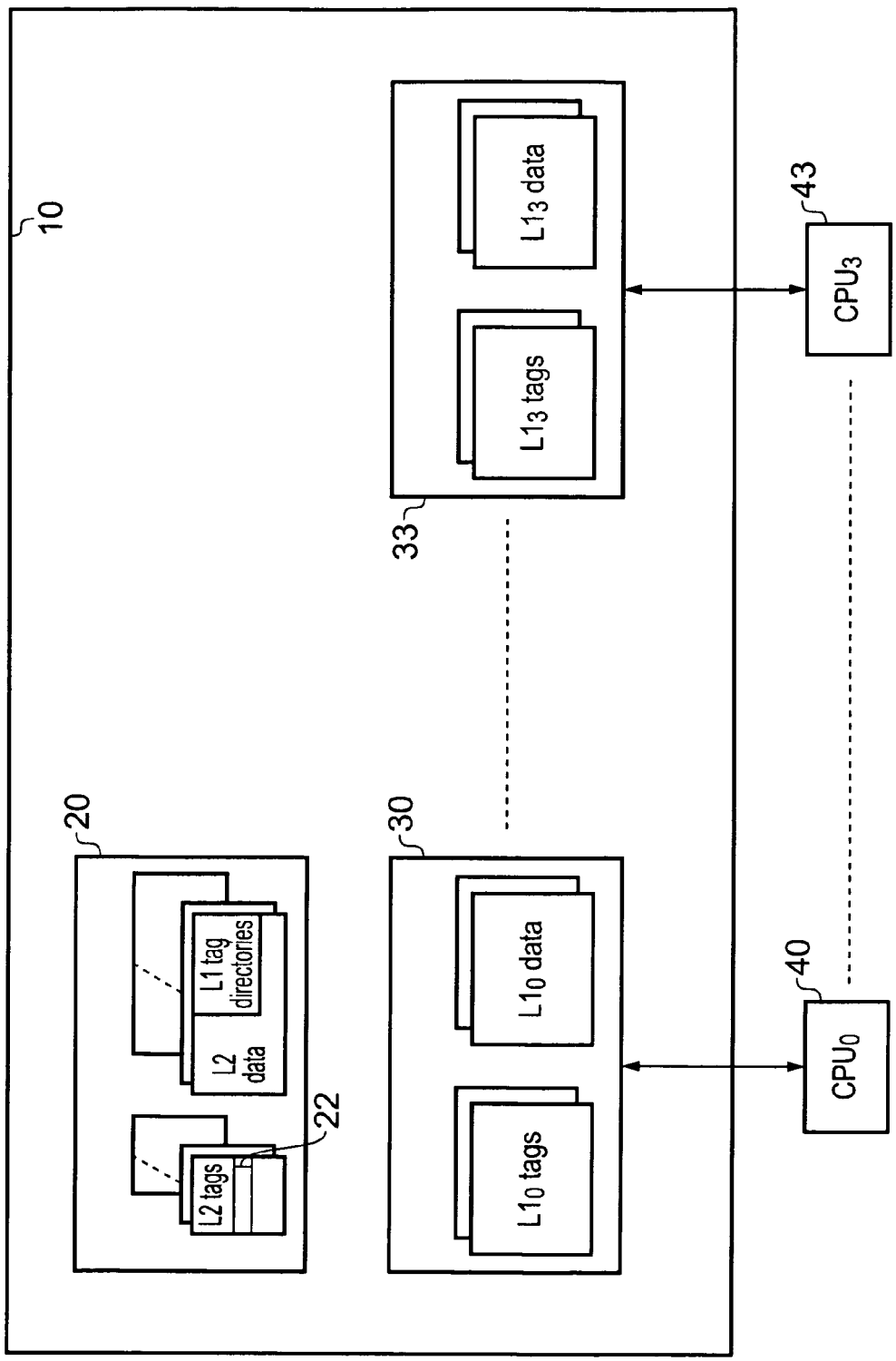
FIG. 1 shows a data storage apparatus according to an embodiment of the present invention.

FIG. 1 shows a data storage apparatus 10 according to an embodiment of the present invention. Data storage apparatus 10 comprises a level two cache 20 and four level one caches 30-33 which respectively communicate with four processors 40-43. This is a multiprocessor system with each of the four processors having its own level one cache.

The storage system 10 is an inclusive storage system so that copies of data items in the level one caches 30-33 are stored in the level two cache 20. These caches are set associative caches and each of the level one caches is a two way set associative cache, while the level two cache 20 is a sixteen way set associative cache. Thus, half of the ways of the level two cache can mirror the data in the level one caches and half of its ways are free to store other data. It should be noted that particular ways are not allocated for a particular purpose, it is just that there will be sufficient space in half of the level two store's ways to store all of the data items in the level one stores if all of the level one caches are full and storing different data items, which map to the same L2 set.

These set associative caches are accessed by using tags and thus, each cache has a tag directory associated with it so that an item to be accessed is identified by the tag and can be found by matching the tag to the tags in the tag directories. In the level two cache, the tag information has an indicator value 22 associated with it and this indicator value indicates whether this item is stored in a level one cache. This indicator value is used to determine whether or not this line can be evicted when a new data item is to be written to the level two cache. In order to maintain the cache as an inclusive cache, it is important that data items that are also stored in any of the level one caches are not overwritten in the level two cache.

The presence of the indicator bit also means that when allocating a line in the level two cache, one does not need to snoop the level one caches to see if the line is present there, because if the indicator bit is not set then one can be sure that that line is not present in any of the level one caches. This makes the allocation of a line in the level two cache fast and power efficient.

In this embodiment, in addition to a copy of all of the items stored in the level one caches, there is also a copy of the level one tag directories stored in the level two cache. These are used when updating the indicator values as is explained below.

In this embodiment, each tag entry has an indicator value 22 associated with it. This indicator value indicates if there is a copy of the item in any one of the level one caches. However, as there are plural level one caches, it may be that there is a copy in more than one of the level one caches. Thus, if a line is evicted from a level one cache, it is important that the indicator value is updated if this indicator information is to remain useful, and if the level two cache is not to become completely full of items that one can not overwrite. Thus, in response to an eviction of an item in the level one cache, the copy of the level one cache's tag directories that are present in the level two cache are snooped to see if this item is stored in any other of the level one caches. If it is not, indicator value 22 associated with the item in the level two cache can be reset. If however, there is a copy in one of the other level one caches, then this value is not reset. Once the value has been reset, then this item is available to be allocated in response to a line allocation in the level two cache.

Figure 2:
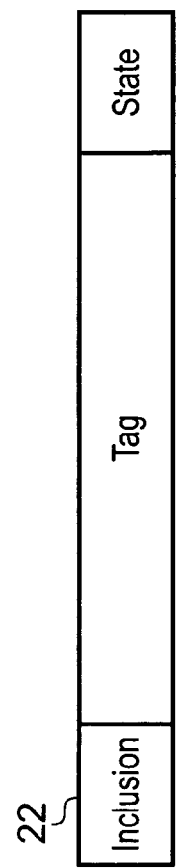
FIG. 2 shows an entry in a tag directory for a level two cache according to an embodiment of the present invention.

FIG. 2 shows an example entry from a level two tag directory line. Thus, in this line there is tag information which is used to locate the item, state information indicating a state of the item stored, and an indicator or inclusion value 22. State information is generally information concerning the coherency of the system and includes things such as whether the item is valid or whether it is dirty. A dirty item is one which has been updated, but which has not had coherency operations performed on it so that other copies of the item present elsewhere on the processor may not have been similarly updated. The indicator value 22 may be a single bit indicating that there is a corresponding value in any one of the level one caches as in FIG. 1, or it may comprise several bits, one for each of the level one caches present, or one for a group of level one caches. In the case that each bit corresponds to a level one cache, one can immediately tell from reading these bits whether or not the item is stored in any of the level one caches. In this way information regarding this item for all of the level one caches is provided without snooping the level one tag directories. Furthermore, each bit corresponding to a cache can be reset when a line from that cache is evicted, without worrying about whether or not that item is stored in any other level one cache. However, the provision of the information in this way does have the drawback of requiring additional storage space.

Figure 3:
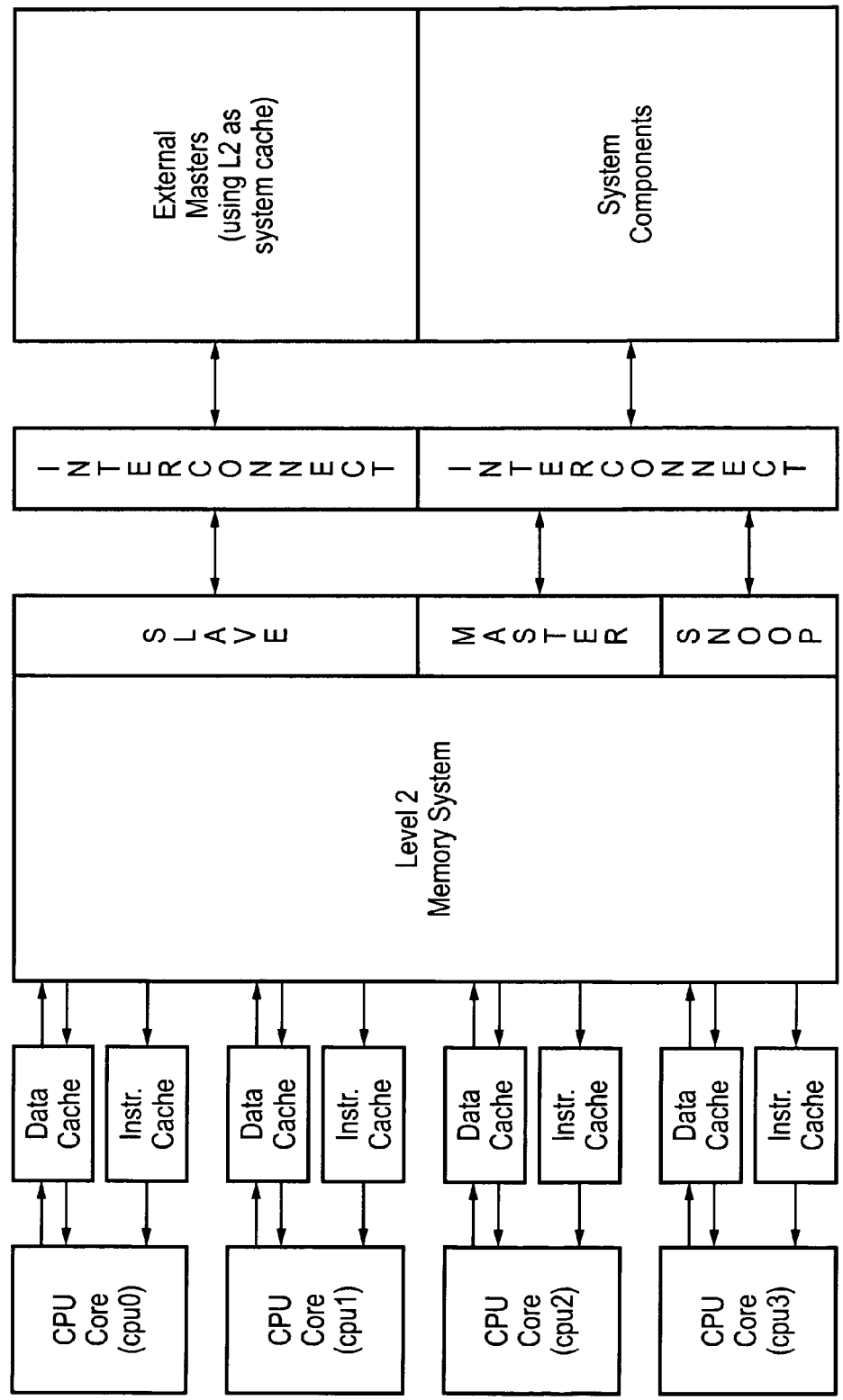
FIG. 3 shows a data processing apparatus according to an embodiment of the present invention.

FIG. 3 shows a data processing apparatus according to an embodiment of the present invention. This data processing apparatus has four CPU cores, which each have a data cache and an instruction cache. The data caches are implemented as two way set associative caches and are inclusive so that copies of all items in them are present in the level two cache, which is a shared cache. The instruction cache for each processor is not inclusive and does not have a copy of all the instructions in the level two cache. The level two cache has snoop directories stored in it and can connect via interconnects with external masters and other system components. In this embodiment, the level two cache is a sixteen way set associative cache, and thus at most eight of the sixteen ways in a given set of the level two cache are occupied by data items from the level one data caches. This implies that there are at least eight ways in each level two set that can hold other cache lines for instructions or older data cache lines that have been evicted from level one data caches.

Whenever a line is being accessed from external memory, the level two cache will replace a line which does not have its inclusion or indicator bit set. Whenever the level one data cache evicts a line the appropriate indicator bit needs to be reset. By supporting inclusion, every eviction from the level one cache is guaranteed to hit in the level two cache. This provides a mechanism to quickly clean and invalidate the contents of the level one caches, enabling the processor to be powered down to extend battery life in a quick and efficient manner.

In order to manage the indicator bits, the following actions need to be performed:

the indicator bit needs to be set when allocating a line in level two cache associated with the load request missed;

the indicator bit needs to be set for a load request when hitting in the level two cache where the current indicator bit is inactive;

the indicator bit needs to be cleared when the level one data cache evicts a line and no other processor's cache has a copy of the line.

In particular, storing all data from the level one caches in the level two caches means that cleaning and invalidating level one caches at power down is quicker as the bottleneck at the external boundary of the caches is reduced. This is true where the level two cache is a retention cache, which does not need to be cleaned and invalidated on power down.

A further advantage occurs in multiprocessor systems. In such systems, if a transaction from an external snoop queries the level two cache, the level two cache has knowledge of all the level one and level two caches and thus, the snoop does not need to be passed to the level one cache because if the item is not present in the level two cache, one can be sure with inclusion that it is not present in the level one cache.

Figure 4:
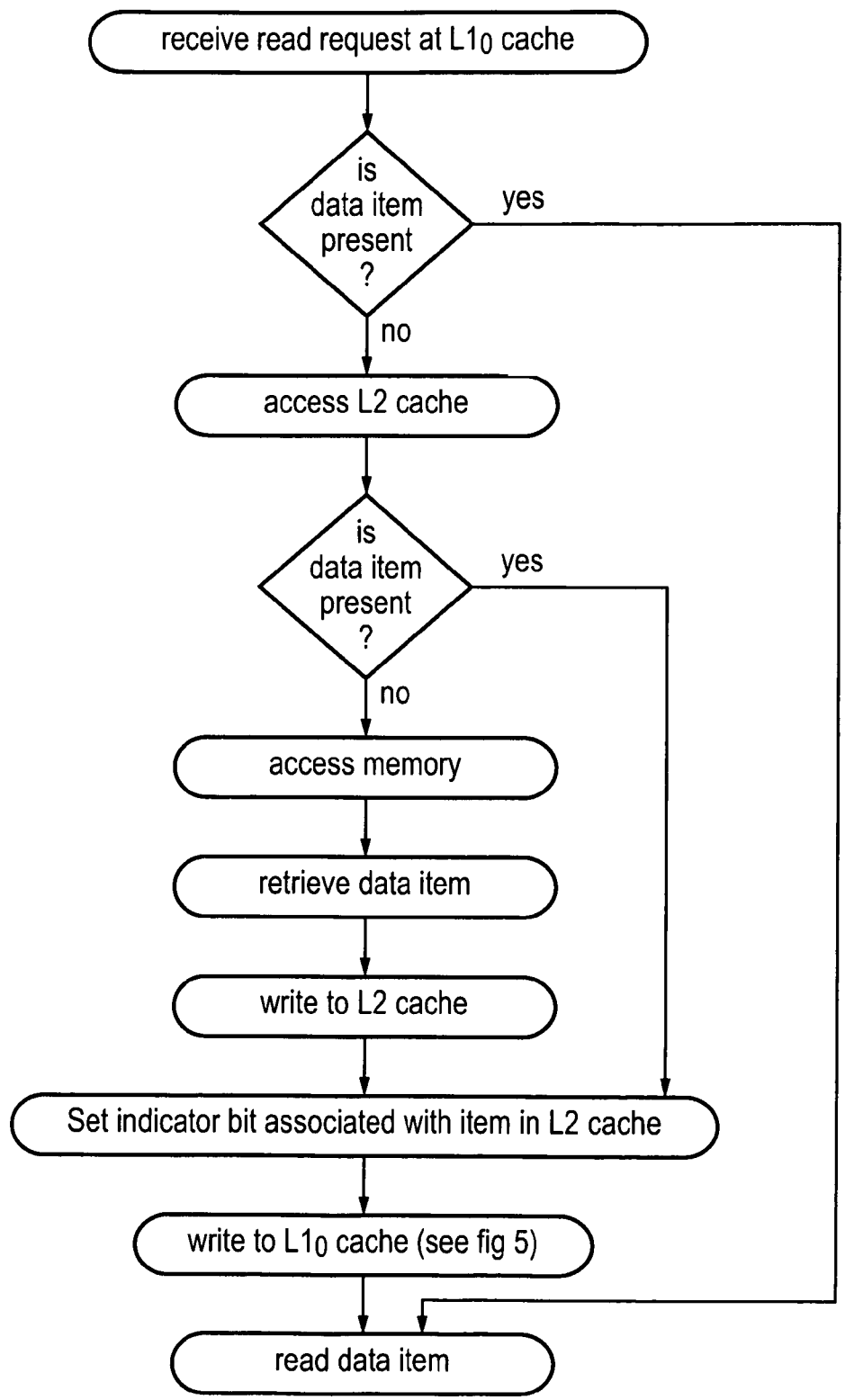
FIG. 4 shows a method of reading a value from a level one cache according to an embodiment of the present invention.

FIG. 4 shows a flow diagram illustrating steps in a method when data is read from a level one $L1_0$ cache. Firstly a read request is received to read a data item from the level one cache communicating with the first CPU. Initially it is determined whether the data item is present, if it is present then it is read from this level one cache. If it is not present, then the level two cache is accessed and it is determined if the data item is present there. If it is, then the indicator bit associated with the item in the level two cache is set and the item is written to the level one cache; the data item can then be read. It should be noted that the step of setting the indicator bit in the level two cache, writing to the level $L1_0$ cache and the reading of the data item can be performed in any order. In this regard if the item hits in the L2 cache, generally the data is forwarded (read) before writing to the level one cache. With regard to the step of writing to the level $L1_0$ cache, this is described in FIG. 5.

Figure 5:
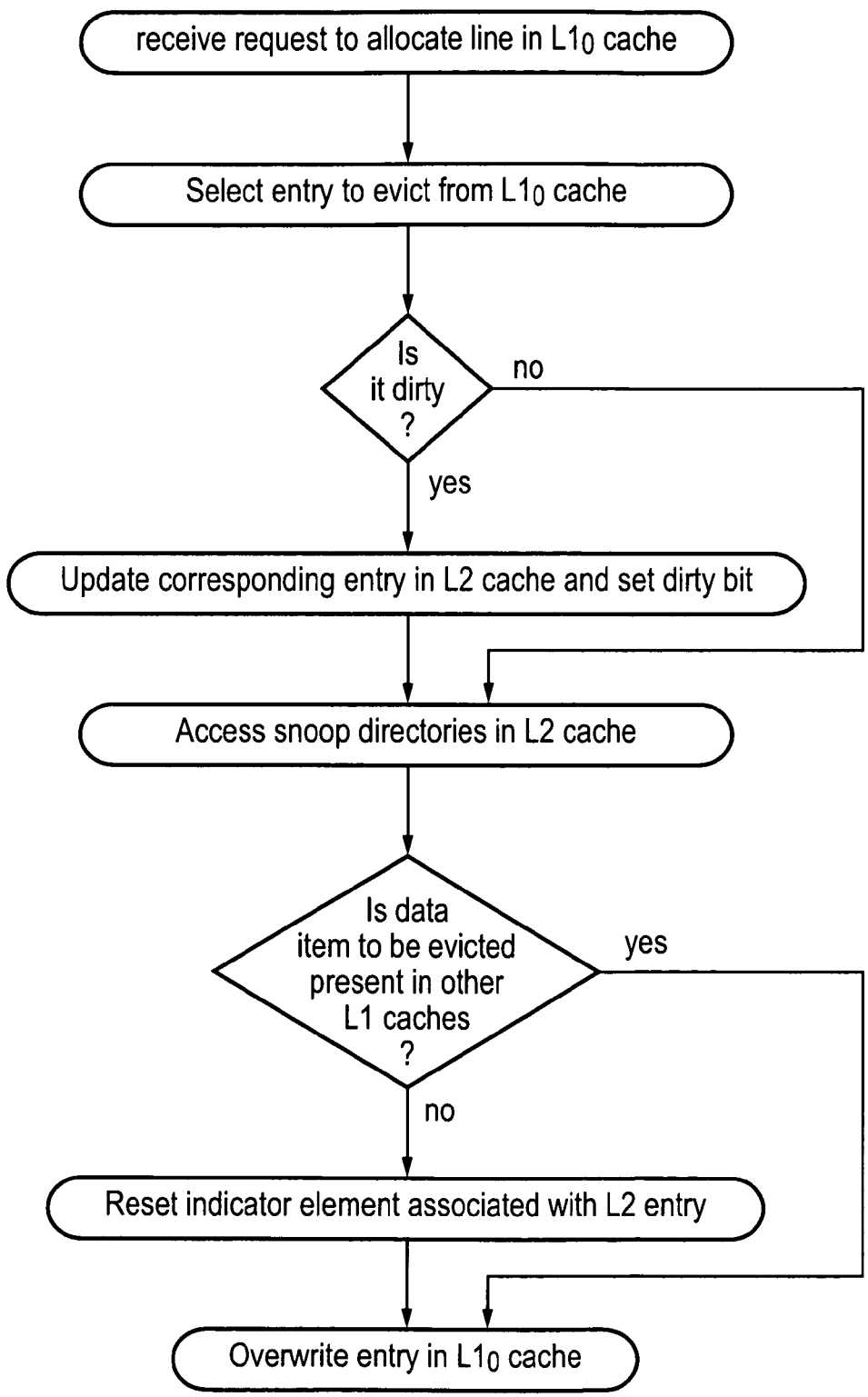
FIG. 5 shows a method of overwriting a value in a level one cache according to an embodiment of the present invention.

FIG. 5 shows how a line is selected to be evicted from the level one cache. In response to a request to allocate a line in the $L1_0$ cache an entry to be evicted from the level one cache is selected and it is determined whether it is dirty or not. If it is dirty, then the corresponding entry in the level two cache needs to be updated with this value and its dirty bit set. If it is not dirty, then one proceeds to the next step, which is to access the snoop directories in the level two cache to see whether or not the entry being evicted is currently in the other level one caches. If it is not, then the indicator element associated with the level two entry can be reset, if it is then it cannot be reset. Following this the entry in the level $L1_0$ cache is overwritten.

Figure 6:
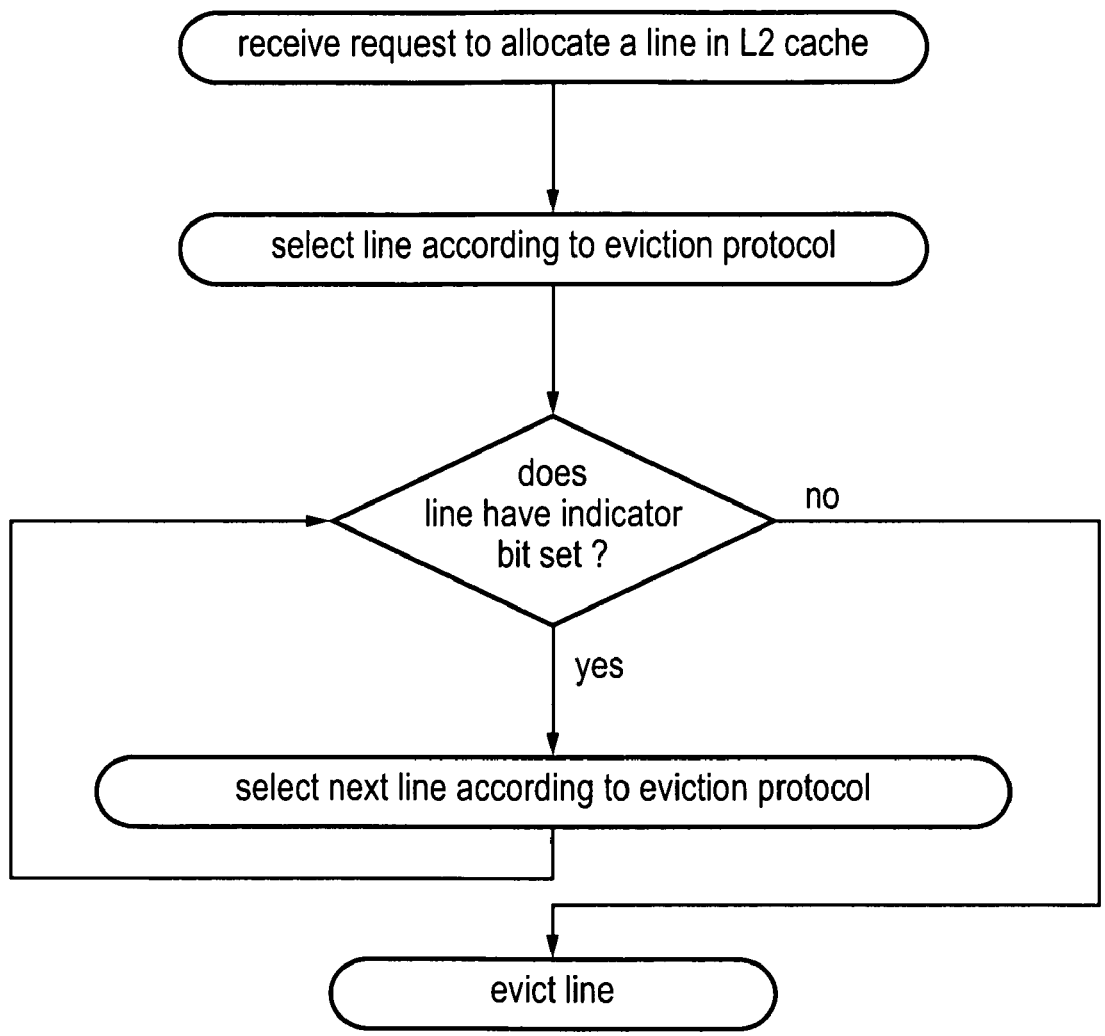
FIG. 6 shows a method of selecting a line for eviction from a level two cache according to an embodiment of the present invention.

FIG. 6 shows the protocol of how a line is selected to be evicted from the level two cache. Initially a request to allocate a line in the level two cache is received, and a line is selected according to an eviction protocol. It is then determined whether the line selected has its indicator bit set. If it does, then it cannot be evicted and a next line is selected according to an eviction protocol. This is repeated until a line is selected that does not have its indicator bit set and this line is then evicted.

It should be noted that although not shown in this Figure, if there is not an entry that does not have its inclusion bit set, which might occur if there aren't enough extra ways in the L2 cache then a line would need to be evicted from the $L1_0$ cache and the corresponding line in the L2 cache could then be evicted.

Figure 7:
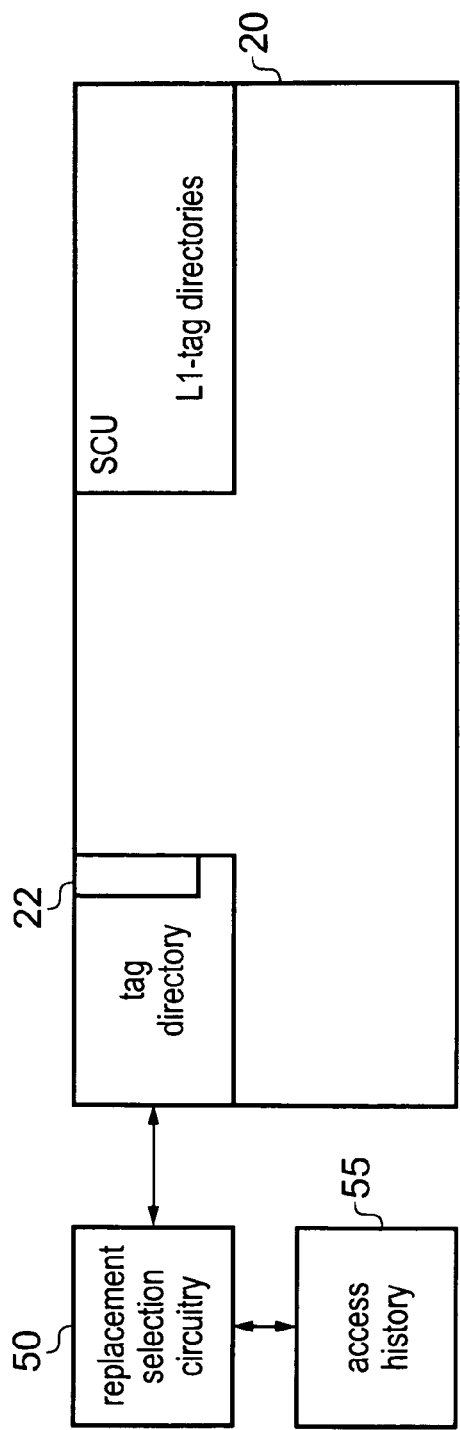
FIG. 7 shows a level two cache and line replacement circuitry according to an embodiment of the present invention.

FIG. 7 shows a level two cache 20 that has replacement selection circuitry 50 associated with it. This replacement selection circuitry 50 can access a history buffer 55 which has a history of recent accesses to the entries in the level two cache. The replacement selection circuitry 50 can also access the tag directory to determine which entries have their indicator bit set. Thus, the replacement selection circuitry 50 selects a line to be evicted according to an eviction protocol, which generally selects a line that has been used least recently. Having selected a line and before evicting it, the replacement selection circuitry first determines whether or not the line has its indicator bit set. If it does then it cannot be evicted, and thus, in such a case the next least recently used line that does not have its indicator bit set will be selected for eviction using information from the history buffer, and if this does not have its indicator bit set, it will be evicted, otherwise a next line will be selected and so on.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. A storage apparatus for storing data, said storage apparatus comprising:

a plurality of stores having storage locations for storing data items, said stores including at least one level one store and a level two store, said storage apparatus having a hierarchy such that, in response to an access request for accessing a data item, at least one of said at least one level one store is accessed and, in response to detecting that said item is not stored in said one of said at least one level one store, said level two store is accessed;

said storage apparatus is configured to store a copy of at least one data item in both of said at least one level one store and said level two store, said storage apparatus comprising a plurality of indicator storage elements associated with a corresponding plurality of storage locations of said level two store, a set value of an indicator stored in one of said indicator storage elements indicating that said at least one data item is also stored in said at least one level one store, wherein said storage apparatus is configured such that, in response to request to allocate a storage location in said level two store, storage locations having a said set value of said indicator are not selected for eviction.

2. A storage apparatus according to claim 1, wherein said plurality of stores comprise set associative stores, each of said set associative stores comprising a tag directory, said tag directory comprising a plurality of storage locations for storing a plurality of tags, each tag indicating a block in said corresponding store where a item is stored and each tag having associated therewith state information, said state information for items in said level two store including said indicator element for said item.

3. A storage apparatus according to claim 1, wherein said level two store comprises an equal or greater number of associative sets than a total number of associative sets of all of said at least one level one stores.

4. A storage apparatus according to claim 1, said storage apparatus comprising a plurality of level one stores, said indicator storage element comprising a plurality of indicators one for each of said plurality of level one stores, a set value of each of said plurality of indicators indicating that said corresponding stored data item is also stored in said corresponding level one store, a data item being selected for eviction from said level two store only if none of said plurality of indicators in said associated indicator storage element are set.

5. A storage apparatus according to claim 1, said storage apparatus comprising a plurality of level one stores, said storage apparatus being responsive to a data item being evicted from one of said plurality of level one stores to detect if said data item is stored in any other of said plurality of level one stores and if it is not to reset said indicator value stored in association with said data item stored in said level two store.

6. A storage apparatus according to claim 5, said storage apparatus comprising a tag directory corresponding to each of said level one stores in said level two store, said tag directory comprising a plurality of storage locations for storing a plurality of tags, each tag indicating a block in said corresponding store where a item is stored said storage apparatus being configured to detect if said data item is stored in any other of said level one stored from said tag directories.

7. A storage apparatus according to claim 1, said storage apparatus being configured to store a copy of all data items stored in said at least one level one store in said level two store.

8. A storage apparatus according to claim 1, wherein in response to a power down signal, said at least one level one store is powered down and said level two store enters a low power data retention mode, said storage apparatus being configured to clean and invalidate all storage locations in said at least one level one store prior to powering down said at least one level one store.

9. A storage apparatus according to claim 1, wherein said stores comprise caches.

10. A storage apparatus according to claim 1, wherein said storage apparatus is configured such that:
in response to a data item being stored in said at least one level one store that is not stored in said level two store, said data item is allocated a line in said level two store and said corresponding indicator is set;
in response to a data item being stored in said at least one level one store that is stored in a storage location in said level two store, said indicator associated with said storage location is set; and
in response to a data item being evicted from said at least one level one store and said data item no longer being stored in any level one store, said indicator corresponding to said data item stored in said level two store is reset.

11. A data processing apparatus having a storage apparatus according to claim 1, and a plurality of processors for processing data, said storage apparatus having a corresponding plurality of level one stores, an access request from one of said plurality of processors being routed to a corresponding one of said plurality of level one stores and if said item is not stored in said corresponding level one store said level two store is accessed.

12. A method of storing data in a data storage apparatus comprising a plurality of stores including at least one level one store and a level two store said storage apparatus having a hierarchy such that in response to an access request for accessing an item said at least one level one store is accessed and in response to detecting that said item is not stored in said at least one level one store said level two store is accessed; said storage apparatus being configured to store a copy of at least some items in both of said at least one level one store and said level two store, said storage apparatus comprising a plurality of indicator storage elements associated with a corresponding plurality of storage locations for storing a plurality of items of said level two store, a set value of an indicator stored in one of said indicator storage elements indicating that said corresponding stored data item is also stored in said at least one level one store, said method comprising the steps of:
receiving a request to allocate a line in said level two store;
selecting a line for eviction that does not have an said set value of said indicator.

13. A method according to claim 12, said storage apparatus comprising a plurality of level one stores, said method comprising the further step of:
in response to a data item being evicted from one of said plurality of level one stores detecting if said data item is stored in any other of said plurality of level one stores and if it is not resetting said indicator value stored in association with said data item stored in said level two store.

14. A method according to claim 13, comprising a further step of;
storing a tag directory corresponding to each of said level one stores in said level two store, said tag directory comprising a plurality of storage locations for storing a plurality of tags, each tag indicating a block in said corresponding store where a item is stored; and
detecting if said data item is stored in any other of said level one caches from said tag directories.

15. A method according to claim 12, said storage apparatus being configured to store a copy of all data items stored in said at least one level one store in said level two store.

16. A method according to claim 12, said method comprising a further step of:

in response to a power down signal, cleaning and invalidating all storage locations in said at least one level one store; and powering down said at least one level one and setting said level two store to a low power data retention mode.

17. A method according to claim 12, said method comprising the further steps of:

in response to a data item being stored in said at least one level one store that is not stored in said level two store, allocating a line in said level two store and setting said corresponding indicator;

in response to a data item being stored in said at least one level one store that is stored in a storage location in said level two store, setting said indicator associated with said storage location; and in response to a data item being evicted from said at least one level one store and said data item no longer being stored in any level one store, resetting said indicator corresponding to said data item stored in said level two store.

18. A means for storing data, said means for storing data comprising:

a plurality of storage means for storing data items in storage locations, said storing means including at least one level one storage means and a level two storage means, said means for storing data having a hierarchy such that, in response to an access request for accessing a data item, at least one of said at least one level one storage means is accessed and, in response to detecting that said item is not stored in said one of said at least one level one storage means, said level two storage means is accessed;

said means for storing data is configured to store a copy of at least one data item in both of said at least one level one storage means and said level two storage means, said means for storing data comprising a plurality of indicator storage elements associated with a corresponding plurality of storage locations of said level two storage means, a set value of an indicator stored in one of said indicator storage elements indicating that said at least one data item is also stored in said at least one level one storage means, wherein said means for storing data is configured such that, in response to a request to allocate a storage location in said level two storage means, storage locations having said set value of said indicator are not selected for eviction.

19. A method according to claim 12, said storage apparatus comprising a plurality of level one stores, said indicator storage element comprising a plurality of indicators, one indicator for each of said plurality of level one stores, a set value of each of said plurality of indicators indicating that said corresponding stored data item is also stored in said corresponding level one store, a data item being selected for evection from said level two store only if none of said plurality of indicators in said associated indicator storage element are set.

* * * * *